US012681879B2

(12) United States Patent
Chen et al.

(10) Patent No.: US 12,681,879 B2
(45) Date of Patent: Jul. 14, 2026

(54) COMBINATION CONNECTOR

(71) Applicant: Hewlett-Packard Development Company, L.P., Spring, TX (US)

(72) Inventors: Po Chun Chen, Taipei City (TW);
Ming Shan Tsai, Taipei City (TW);
Chih-Chung Yu, Taipei City (TW);
Pao Jen Chen, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 242 days.

(21) Appl. No.: 18/343,635

(22) Filed: Jun. 28, 2023

(65) Prior Publication Data

US 2025/0004965 A1      Jan. 2, 2025

(51) Int. Cl.
*G06F 13/20* (2006.01)
*G06F 13/38* (2006.01)
*G06F 13/42* (2006.01)

(52) U.S. Cl.
CPC ........ *G06F 13/382* (2013.01); *G06F 13/4221* (2013.01); *G06F 2213/0042* (2013.01); *G06F 2213/3852* (2013.01)

(58) Field of Classification Search
CPC ... H05K 5/0247; G06F 1/187; G06F 13/4068; G06F 13/4221; G06F 2213/0026; G06F 13/1684; G06F 13/4022; G11C 5/04; G11C 5/025; G11C 5/063; G11C 5/145; G06K 19/07743; H10B 80/00
See application file for complete search history.

(56) References Cited

U.S. PATENT DOCUMENTS

| | | | | |
|---|---|---|---|---|
| 10,303,634 | B2 * | 5/2019 | Nemoto | ............. G06F 13/4081 |
| 11,314,683 | B2 * | 4/2022 | Lai | ...................... G06F 13/4022 |
| 2011/0086551 | A1 | 4/2011 | Novotney et al. | |
| 2014/0287603 | A1 | 9/2014 | Son et al. | |
| 2016/0335222 | A1 * | 11/2016 | Schnell | ................ G06F 13/385 |
| 2017/0294745 | A1 * | 10/2017 | Nozawa | ............. H01R 13/6591 |
| 2020/0226087 | A1 * | 7/2020 | Sun | ...................... H04N 21/442 |
| 2023/0339009 | A1 * | 10/2023 | Sakuramoto | ......... B21D 35/001 |

FOREIGN PATENT DOCUMENTS

EP           2390969 A1     11/2011

* cited by examiner

*Primary Examiner* — Henry Tsai
*Assistant Examiner* — Kim T Huynh
(74) *Attorney, Agent, or Firm* — Quarles & Brady LLP

(57)           ABSTRACT

A combination connector for receiving DisplayPort and Universal Serial Bus (USB) Type-C type connectors. The combination connector includes a PCB with a first row of DisplayPort pins and a second row of USB pins on either side of the PCB. The second row of USB pins are provided on a projection along one edge of the PCB such that the projection can interface physically and electrically with a USB Type-C connector. A removable I/O baffle matching the profile of a DisplayPort connector can support the USB Type-C connector and provide electrical grounding. When the I/O baffle is removed, a DisplayPort connector can be inserted into the combination connector to interface with the first row of DisplayPort pins. A pair of detection pins within the connector allow the electronic device to identify a type of a connected connector and selectively enable power delivery and data transfer for an appropriate operating mode.

20 Claims, 11 Drawing Sheets

COMBINATION CONNECTOR

BACKGROUND

Generally described, computing devices or electronic devices can be configured to provide various inputs and outputs, such as to users of the electronic devices. Examples of electronic devices include, but are not limited to, mobile phones, tablets, base stations, network access points, customer-premises equipment (CPE), laptops, cameras, and wearable electronics. Electronic devices can include external input devices, output devices, or a combination that allow for the exchange of content in the form of audio, video, or a combination of audio and video data. Such external input and output devices can be generally referred to as peripheral devices.

To facilitate communication with peripheral devices, electric devices can be configured with various physical ports that include some form of jack or socket for electronically coupling a peripheral device to the electronic device. For example, a peripheral device may be electrically connected to an electronic device via a cable that can physically couple with a port on the electronic device based on mating complimentary connectors provided on the port and on the cable.

BRIEF DESCRIPTION OF THE DRAWINGS

FIG. 1 is a schematic representation of an example of a printed circuit board (PCB) having multiple communication interfaces;

FIG. 2 is a side cross-sectional view of an example of a combination connector with the multi-interface PCB of FIG. 1;

FIG. 4 is a perspective view of the combination connector of FIGS. 2-3;

FIG. 5B is a side cross-sectional view of an example of a combination connector with the DP cable connector of FIG. 5A partially inserted;

FIG. 6 is a perspective view of the removable I/O baffle of FIG. 3B;

DETAILED DESCRIPTION

Figure 3A:
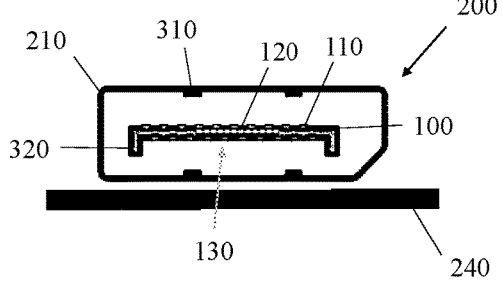
FIG. 3A is a front elevational view of the combination connector of FIG. 2.

The shape and dimensions of the connectors provided on the ports and corresponding cabling system interfaces (e.g., an interface) can vary greatly. For example, the shape and dimension of connectors/ports can be specified or selected based on proprietary designs, such as by a manufacturer. In another example, the shape and dimension of connectors/ports can be specified based on technical standards, such as standards specifying hardware configurations of the ports, communication/data transmission protocols, and the like. For example, interfaces associated with one of the Universal Serial Bus (USB) communication protocols have a different shape and dimension than interfaces associated with the Display Port (DP) communication protocol.

In many instances, electronic devices may be configured with a number of different ports to allow for use of the electronic device with peripheral devices using multiple communication protocols or multiple types of connectors. Accordingly, the number and types of connectors that can be used with individual electronic devices is often limited by the physical space on the housing of the electronic device to provide a port and the selection of hardware configurations for each individual port. A solution is sought to increase the diversity of ports and density of connectors of an electronic device.

Certain examples described herein provide an apparatus and method for facilitating digital communication between electronic devices. Generally, aspects relate to the utilization of electronic devices including notebook computers and mobile devices to interface with one or more peripheral devices. Specifically, one or more aspects relate to incorporation or integration of a single port configured to interface with multiple external connectors having different dimensions and shapes, generally referred to as a combination connector. Such aspects can include, but are not limited to, using a combination connector capable of receiving DisplayPort (DP) and Universal Serial Bus (USB) Type-C cable connectors. The resulting connection between the combination connector and the corresponding cable connector can be used to facilitate communication exchange with peripheral devices according to various communication and video transmission protocols including USB, DisplayPort, High-Definition Multimedia Interface (HDMI), or Digital Visual Interface (DVI) protocols. Examples of peripheral devices can include external displays, keyboards and mice, cameras, printers, portable media players, disk drives, network adapters, mobile phones, and other electronic devices. Other aspects further include using a plurality of detection pins in identifying a type of the cable connector to automatically update an operating mode of the combination connector for communication via the appropriate protocol.

With reference to the previous general example, a DisplayPort cable can be connected to the combination connector. Control logic associated with the combination connector can then identify the DisplayPort cable as a display cable and selectively enable DisplayPort functionality of a digital display interface (DDI). In some examples, a DisplayPort source of the electronic device can support dual-mode DisplayPort for multi-mode communication via the DDI of the combination connector. Additionally, a USB Type-C cable can also be connected to the same combination connector in other instances. The control logic can also identify the USB Type-C cable as a serial cable and selectively enable USB functionality of a serial data interface. A USB host of the electronic device can support various USB operating modes, including Full Speed USB, High Speed USB, Super Speed USB, and Super Speed+USB for compatibility with various peripheral devices. In some examples, the combination connector can be connected directly to another electronic device which is at least partially responsible for negotiating the serial connection. The control logic of the combination connector selectively enables data and power delivery to the DDI and the serial data interface to prevent damage or incompatibility with connected devices. Once the control logic has positively identified the cable type via the plurality of detection pins, the operating mode of the combination connector is updated and power delivery to either interface is enabled.

In some examples, a removable input-output (I/O) baffle is provided with the combination connector to enable USB Type-C functionality. Without the I/O baffle, the combination connector can operate normally as a DisplayPort connector by identifying a DisplayPort cable via the detection pins. When USB operation is desired, a user inserts the removable I/O baffle into the combination connector to block the digital display interface and expose only the serial data interface via an opening in the I/O baffle. The removable I/O baffle can trigger one of the detection pins similarly to a DisplayPort cable to indicate to the control logic that the combination connector is blocked off for USB operation. A USB Type-C cable connector can then pass through the opening in the I/O baffle to communicate over the serial data interface. In certain examples, the removable I/O baffle can physically support the Type-C cable connector and/or provide grounding of the cable to a chassis of the electronic device.

Figures 1, 2:
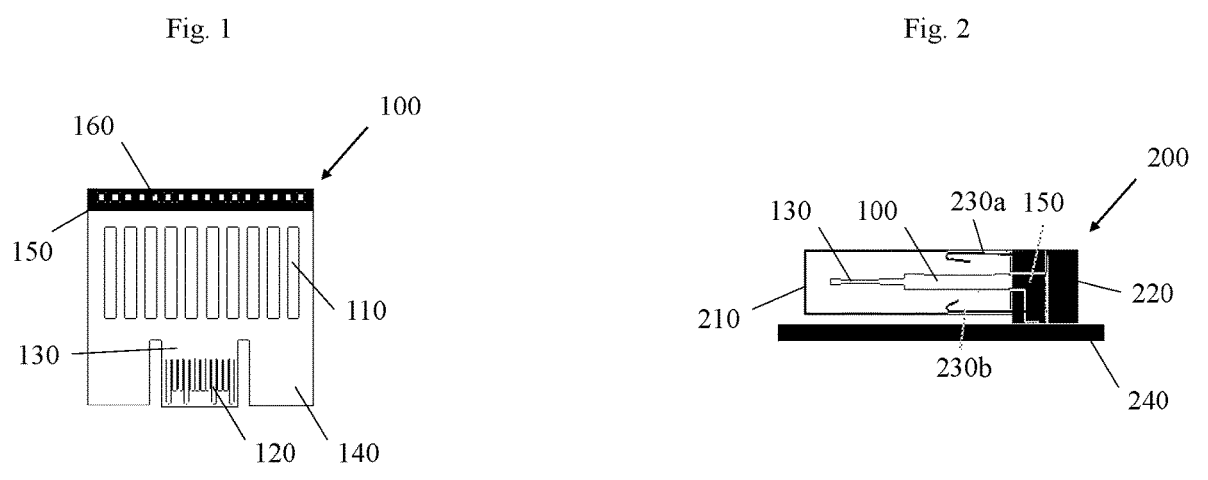

Referring initially to FIG. 1, a schematic representation of an example of a combination connector corresponding to aspects of the present application is shown. The combination connector illustratively comprises a printed circuit board (PCB) 100 having multiple communication interfaces (hereafter referred to as an interface PCB or substrate 100). The interface PCB 100 can be a multi-layer PCB with communication interfaces for electrically connecting to a cable on either side of the PCB 100. The interface PCB 100 can have a length defining a first edge 150 and a second edge of the PCB, wherein the first edge 150 corresponds to a physical connection to an electronic device (such as a computing device) and the second edge is to receive a cable connector through an opening defined in a connector housing.

A first communication interface 110 comprising a first plurality of contact pins is disposed in a central region proximate to the first edge 150 on either side of the interface PCB 100 and spaced apart along a substantial portion of a width of the PCB 100. In some examples, the first communication interface 110 is a digital display interface (DDI) comprising 20 or more contact pins, such as a DisplayPort (DP) interface. A second communication interface 120 comprising a second plurality of contact pins is disposed on either side of a narrow projection 130 proximate to the second edge of the interface PCB 100. The narrow projection 130 and the second set of pins can be centered along a central axis of the interface PCB 100. The PCB 100 can further include a pair of notches on opposite sides of the second set of pins which define two equal-sized non-conductive portions 140 of the interface PCB 100. The narrow projection 130 can also have a thickness less than a thickness of the central portion of the interface PCB 100. In some examples, the second communication interface 120 is a serial interface comprising 24 or more contact pins, such as a Universal Serial Bus (USB) Type-C interface.

The interface PCB 100 further comprises a third plurality of contact pins 160 disposed on at least one side of the PCB 100 along the first edge 150. Each of the third plurality of contact pins 160 can be electrically connected to one or more pins of the first communication interface 110 or the second communication interface 120 by a plurality of PCB traces.

As will be discussed herein, the third plurality of contact pins 160 can be connected to a motherboard of an electronic device to facilitate communication via the first communication interface 110 and the second communication interface 120.

FIG. 2 illustrates a cross-section of an example of a combination connector 200 in accordance with aspects of the present application. The combination connector 200 includes the interface PCB 100 shrouded within a conductive connector housing 210, the housing defining an outward opening proximate to the narrow projection 130 to accept a first type or a second type of cable connector. In some examples, the first type can be a DisplayPort cable connector and the second type can be a USB Type-C cable connector configured to interface with the first communication interface 110 or the second communication interface 120, respectively. A pair of detection pins project outward from the connector housing 210 into the opening on either side of the interface PCB 100. In some examples, the pair of detection pins can be disposed on the surface on either side of the PCB substrate.

The pair of detection pins include a first detection pin 230a and a second detection pin 230b. The detection pins are used to sense a connection state of the combination connector 200 in order to set an appropriate operating mode. For example, the combination connector 200 can have a DisplayPort operating mode wherein the connector 200 operates nominally as a DisplayPort connector via the first communication interface 110. The combination connector 200 can also have a USB operating mode wherein the connector 200 operates nominally as a USB Type-C connector via the second communication interface 120. Other operating modes can include an inactive or disabled mode when no cable is connected, and an error mode when the type of cable connector cannot be positively identified via the pair of detection pins.

The first detection pin 230a can be positioned within a rear the combination connector 200 such that the pin 230a is triggered by insertion of the first type of cable connector. For example, when a DisplayPort cable is fully or nearly fully inserted, the cable connector can form a closed circuit between the first detection pin 230a and the conductive connector housing 210, grounding the detection pin 230a. The second detection pin 230b can be positioned within the rear of the combination connector 200 on the opposite side of the interface PCB 100 such that the pin 230b is triggered by insertion of a removable input-output (I/O) baffle. When a USB Type-C cable is fully inserted, the cable connector alone does not extend to the rear of the combination connector 200 to trigger the second detection pin 230b. As will be discussed herein, an I/O baffle inserted into the combination connector 200 before the second type of cable connector can automatically set the correct operating mode. Each of the pair of detection pins can act as an active low input to control logic of the combination connector 200, reducing the likelihood of incorrect signaling due to noise. In some examples, a voltage of 3.3V or 5V is applied to the pair of detection pins to sense a closed circuit formed by each type of cable connector.

The combination connector 200 further includes a connector base 220 at the rear of the connector 200 where the third plurality of contact pins 160 are fixedly connected to an underlying substrate 240 of an electronic device. For example, the substrate 240 can be the motherboard of a notebook computer, and each of the third plurality of contact pins 160 are soldered to corresponding pads on the motherboard to electrically connect the first communication interface 110 and the second communication interface 120 to the motherboard. The conductive connector housing 210 can also be glued or soldered to the substrate 240 to further anchor the combination connector 200.

FIG. 3A is an elevational view of the combination connector 200 of FIG. 2 in accordance with aspects of the present application and illustrating an outward opening for receiving a cable connector. The connector housing 210 defines a profile of the combination connector 200 to receive a DisplayPort cable connector. Several clamping projections 310 inside the connector housing 210 press against the DisplayPort cable connector to securely hold the cable and provide grounding. The plurality of contact pins of the first communication interface 110 can be seen behind the plurality of contact pins of the second communication interface 120, which extends in front of the first communication interface 110 on the narrow projection 130. The interface PCB 100 can have right-angle bends 320 at either end to provide structural support and resist bending or snapping when a cable connector is canted or twisted. For ease of illustration, the two equal-sized non-conductive portions 140 of the interface PCB 100 adjacent to the narrow projection 130 are not shown, however, the right-angle bend 320 can extend throughout one or both of the non-conductive portions 140 to provide additional support and protect the second communication interface 120.

Figure 3B:
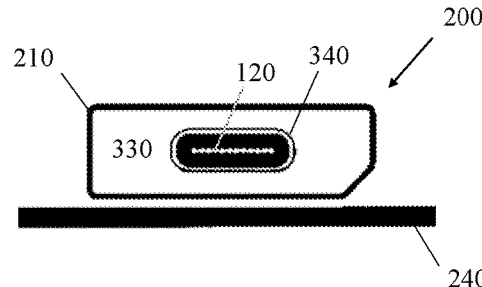
FIG. 3B is a front elevational view of the combination connector of FIG. 2 with a removable input-output (I/O) baffle inserted.

FIG. 3B is an elevational view of the combination connector of FIG. 2 in accordance with aspects of the present application and illustrating a removable input-output (I/O) baffle 330 inserted. As will be discussed herein, the I/O baffle 330 includes a front fascia which substantially blocks the combination connector 200 from receiving a DisplayPort cable connector. A through hole in the front fascia defines an opening adjacent to the second communication interface 120 behind the I/O baffle 330. In some examples, the removable I/O baffle 330 is inserted into the combination connector 200 to prepare the connector 200 for USB Type-C operation by setting the operating mode. The I/O baffle 330 is configured to receive a USB Type-C cable connector within the through hole and physically supports the cable while it is connected to the combination connector 200. In some examples, the I/O baffle 330 can also provide grounding of the cable.

Figure 4:
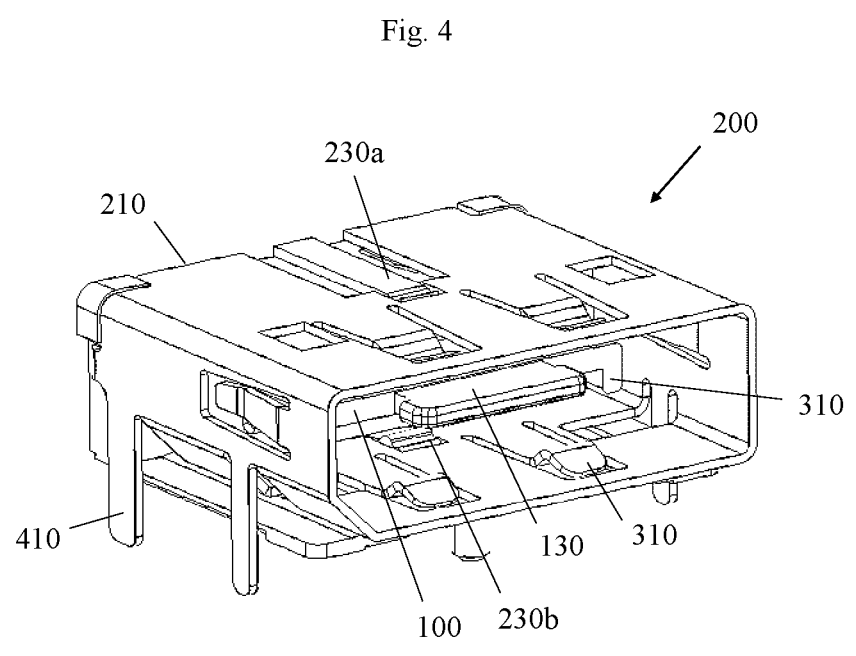

FIG. 4 is a perspective view of the combination connector of FIGS. 2-3 in accordance with aspects of the present application. The conductive connector housing 210 can include a pair of support legs 410 which extend underneath the combination connector 200 for soldering to the substrate 240. In this example, the narrow projection 130 has a beveled edge to accommodate a USB Type-C cable connector more easily. For ease of illustration, the plurality of pins of the second communication interface 120 and the two equal-sized non-conductive portions 140 of the interface PCB 100 adjacent to the narrow projection 130 are not shown.

Figure 5A:
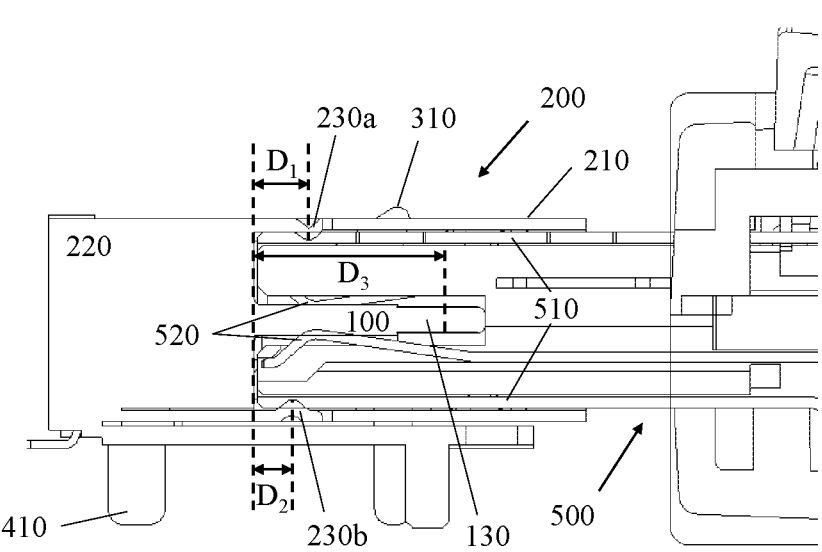
FIG. 5A is a side cross-sectional view of an example of a combination connector with a DisplayPort (DP) cable connector inserted.
Figure 5B:
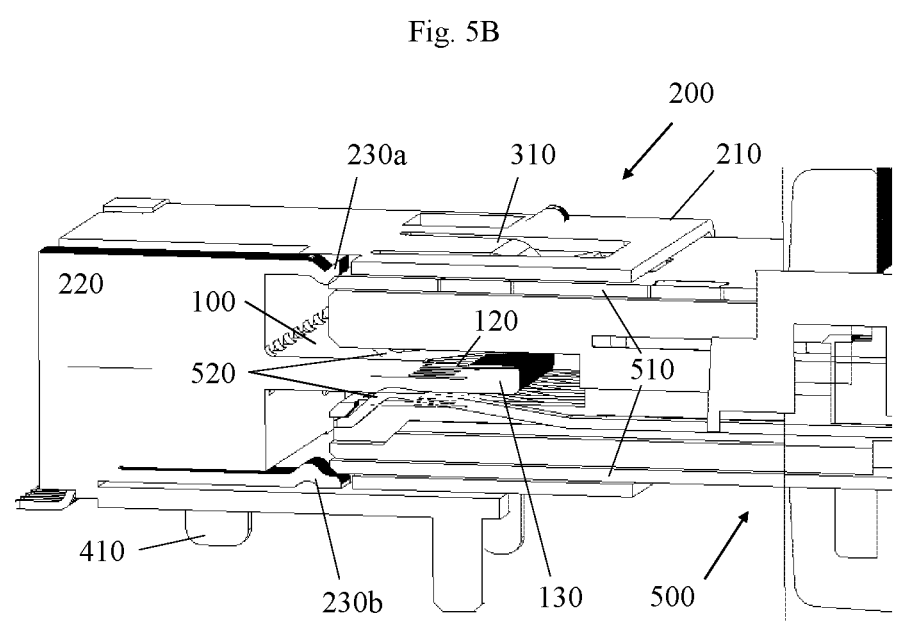

Referring now to FIGS. 5A-5B, examples of the combination connector 200 in accordance with aspects of the present application and illustrating a DisplayPort cable connector 500 inserted are shown. FIG. 5A shows the combination connector 200 with the DisplayPort cable connector 500 fully inserted and the connector 200 configured for a DisplayPort operating mode. FIG. 5B shows the combination connector 200 with the DisplayPort cable connector 500 partially inserted, such as while connecting or disconnecting the cable.

When the DisplayPort cable connector 500 is connected to the combination connector 200, a male end of the cable connector 500 containing a plurality of pins 520 slides over the interface PCB 100 to contact the first communication interface 110. The male end of the cable connector 500 can be held in place by friction applied by the clamping projections 310. (In some examples, the cable connector 500 can further include locking elements that interact with holes in the connector housing 210.) Conductive outer walls 510 on the male end of the cable connector 500 contact the first detection pin 230$a$ and the second detection pin 230$b$ of the pair of detection pins when the cable connector 500 is fully inserted. Control logic for the combination connector 200 can sense a voltage drop caused by the cable connector 500 grounding the pair of detection pins, indicating that the cable connector 500 is a DisplayPort cable and setting the DisplayPort operating mode.

Each of the pair of detection pins are positioned at the rear of the combination connector 200 near the connector base 220 to prevent the pins from being triggered accidentally. Advantageously, both detection pins are only triggered once the DisplayPort cable connector 500 is almost fully inserted. Those skilled in the art will appreciate that this prevents control logic of the combination connector 200 from selecting an incorrect operating mode during cable insertion, which could cause a short circuit or other damage.

The first detection pin 230$a$ contacts the cable connector 500 a first distance D1 from the rear of the combination connector 200, and the second detection pin 230$b$ contacts the cable connector 500 a second distance D2 from the rear of the combination connector 200. In one example, the first distance D1 is about 1.35 millimeters and the second distance D2 is about 0.92 millimeters. It will be understood by those skilled in the art that the conductive outer walls 510 of the male end of the cable connector 500 will contact the first detection pin 230$a$, followed by the second detection pin 230$b$ as the cable connector 500 is inserted into the combination connector 200. In some cases, control logic for the combination connector 200 can trigger a delay or other behavior when activity is detected at the first detection pin 230$a$ to allow the cable connector 500 to be securely seated before identifying the cable type. A debounce circuit may also be connected to either of the detection pins to provide more accurate sensing.

A third distance D3 measured from a center of the narrow projection 130 to the rear of the combination connector 200 is about 3.70 millimeters. When inserting the cable connector 500, the plurality of pins 520 slide over the narrow projection 130 and second communication interface 120 to contact the plurality of pins of the first communication interface 110. The narrow projection 130 and second communication interface 120 are recessed within the male end of the cable connector 500 and electrically disconnected from the DisplayPort cable connector 500 during DisplayPort operation. When withdrawing the cable connector 500, contact with both detection pins is broken before the plurality of pins 520 slide over the second communication interface 120 again. Accordingly, the first communication interface 110 and the second communication interface 120 are only enabled when each of the pair of detection pins have sensed that the appropriate cable type is fully inserted. If no cable connector is inserted, or the cable connector cannot be positively identified by control logic of the combination connector 200, the first communication interface 110 and the second communication interface 120 remain inactive.

Figure 6:
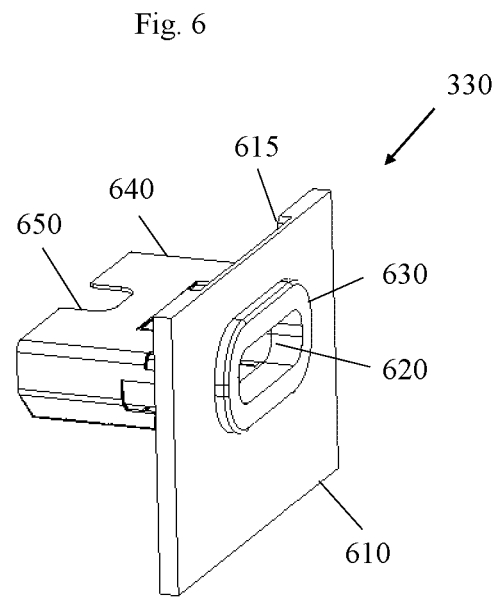

FIG. 6 is a perspective view of the removable I/O baffle 330 of FIG. 3B. The I/O baffle 330 comprises the front fascia 610, including a through hole 620 to receive a male end of a USB Type-C cable connector, and finger recesses 615 along top and bottom edges of the front fascia 610 to help the user remove the I/O baffle 330 from the combination connector 200. In some examples, the front fascia 610 can further include a lip 630 around the through hole 620 having a thickness greater than the rest of the front fascia 610. The lip 630 increases a contact area of the front fascia 610 with the USB Type-C cable connector for a more secure connection. Additionally, the thickness of the lip 630 can be selected to provide appropriate spacing of the USB Type-C cable connector, such that the male end of the connector extends an appropriate depth into the forward opening of the combination connector 200.

The removable I/O baffle 330 further includes a conductive housing 640 which has a complementary profile to that of the connector housing 210. The conductive housing 640 is similar to the outer walls 510 of a DisplayPort cable connector 500, and can be inserted into the combination connector 200 to trigger the pair of detection pins as discussed above. Unlike a true DisplayPort cable connector 500, the conductive housing 640 includes a notch cutout 650 in a top portion of the housing where the first detection pin 230a would contact the I/O baffle 330. Accordingly, control logic of the combination connector 200 can distinguish between a DisplayPort cable connector 500 and the removable I/O baffle 330 by a connection state of each of the pair of detection pins. When both the first detection pin 230a and the second detection pin 230b are triggered (indicated by a short to ground), the combination connector 200 is set for DisplayPort operating mode. However, if only the second detection pin 230b is triggered, the control logic can interpret that the I/O baffle 330 is inserted and set a USB operating mode. The I/O baffle 330 blocks non-USB cable connectors from being inserted, allowing the combination connector 200 to remain in the USB operating mode even when no cable is connected to the second communication interface 120. From the perspective of the user, the combination connector 200 behaves nominally as a USB Type-C connector while the removable I/O baffle 330 is installed.

Figure 7A:
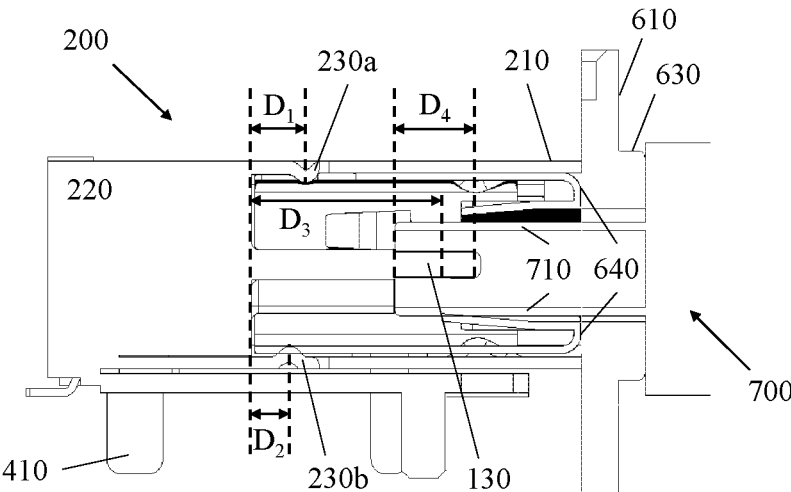
FIG. 7A is a side cross-sectional view of an example of a combination connector with a removable I/O baffle and a Universal Serial Bus (USB) Type-C cable connector inserted.

FIG. 7A is a cross-sectional view of an example of the combination connector 200 in accordance with aspects of the present application and illustrating the removable I/O baffle 330 and a Universal Serial Bus (USB) Type-C cable connector 700 inserted. Side walls 710 of a male end of the USB Type-C cable connector 700 extend through the through hole 620 and into the opening of the combination connector 200. A plurality of pins of the cable connector 700 contact the second communication interface 102 on the narrow projection 130. A depth D4 of the narrow projection 130 can accommodate the USB Type-C cable connector 700. In some examples, the depth D4 is about 2.30 millimeters.

Figure 7B:
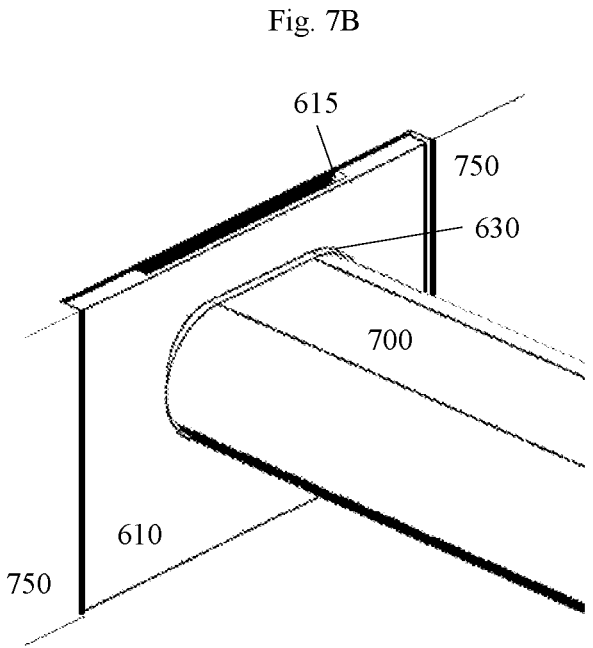
FIG. 7B is a perspective view of an example of the removable I/O baffle and USB Type-C cable connector of FIG. 7A inserted into an electronic device.

FIG. 7B is a perspective view of an example in accordance with aspects of the present application and illustrating the removable I/O baffle 330 and USB Type-C cable connector 700 inserted into an electronic device. The combination connector 200 (not shown) is resided inside a device housing 750 of the electronic device, such as the side of a notebook computer housing. The device housing 750 can have a recessed portion to accommodate the front fascia 610 such that the I/O baffle 330 lies flush within the housing. To remove the I/O baffle 330 from the combination connector 200, the user can disconnect the USB Type-C cable connector 700 and then pull at the finger recesses 615 along top and bottom edges of the front fascia 610.

Figure 8:
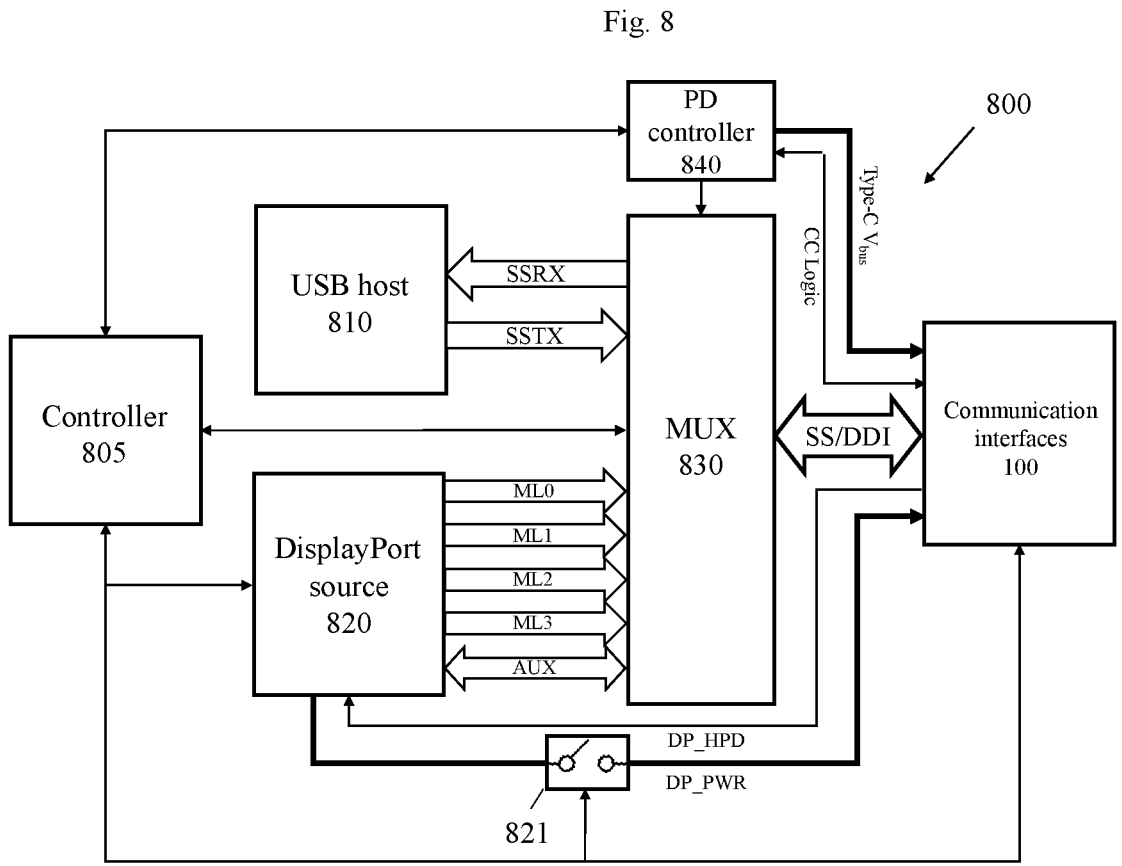
FIG. 8 is a schematic representation of one example of a control circuit for operating the combination connector of any of FIGS. 1-7.

FIG. 8 is a schematic representation of one example in accordance with aspects of the present application and illustrating a control circuit 800 for operating the combination connector 200. The control circuit 800 comprises a controller 805 such as an embedded controller (EC), a super input/output (SIO) controller, or another integrated circuit for monitoring activity on the pair of detection pins. The control circuit 800 further includes a USB host device 810 and a DisplayPort source device 820 communicatively connected to a multiplexer (MUX) 830.

The multiplexer 830 is connected to the USB host device 810 by a plurality of serial data lines, such as Super Speed Transmit (SSTX) and Super Speed Receive (SSRX) lines, although additional serial data lines can be connected as needed to support various USB protocols implemented by the USB host device 810. The multiplexer 830 is also connected to the DisplayPort source device 820 by a plurality of data lanes (ML0, ML1, ML2, and ML3) and an auxiliary channel (AUX), although additional connections are possible. The serial data lanes and DisplayPort data lanes may be collectively referred to as data channels.

The multiplexer 830 and a power delivery (PD) controller 840 are each connected to the interface PCB 100 to selectively enable power delivery to the combination connector 200 and connect the data lines to the combination connector 200 according to the selected operating mode. In some examples, the DisplayPort source device 820 provides power directly to the combination connector 200 via a switch 821 (i.e., a transistor, relay, etc.) enabled by the controller 805 in the DisplayPort operating mode. The power delivery controller 840 can be selectively enabled by the controller 805 in the USB operating mode to provide power to USB peripheral devices via the second communication interface 120.

As discussed herein, the controller 805 can identify, via the first detection pin 230a and the second detection pin 230b, whether a first type of cable connector (DisplayPort) or a second type of cable connector (Type-C) is electrically connected to the combination connector 200. The controller 805 can identify the cable type by sensing, by the first detection pin 230a and the second detection pin 230b, a closed circuit formed by the first type of connector, indicating a DisplayPort operating mode, or sensing, by the first detection pin 230a, a closed circuit formed by the second type of connector, and sensing, by the second detection pin 230b, an open circuit indicating a USB operating mode. In other examples, the controller 805 can identify the cable type by sensing, by the first detection pin 230a, an open circuit, and sensing, by the second detection pin 230b, a closed circuit, indicating an error operating mode, or sensing, by the first detection pin 230a and the second detection pin 230b, an open circuit indicating a disabled operating mode when no cable is detected.

Accordingly, the controller 805 can select an operating mode of the combination connector 200 corresponding to the identified type of cable connector. Based on the selected operating mode, the controller 805 connects, via the multiplexer 830, specific data channels to the first communication interface 110 or the second communication interface 120 of the combination connector 200 according to the selected operating mode. The controller can select, by the multiplexer in the DisplayPort operating mode, a plurality of data lanes to electrically connect to the first communication interface 110 or select, by the multiplexer in the USB operating mode, a plurality of serial data channels to electrically connect to second communication interface 120. The controller 805 also enables power delivery to the combination connector 200 according to the selected operating mode via the power delivery controller 840 or the switch 821.

In certain examples, the DisplayPort source device 820 is communicatively connected to a hot plug detect pin (DP_HPD) of the first communication interface 110 and the power delivery controller 840 is communicatively connected to a configuration channel pin (CC logic) of the second communication interface 120. The hot plug detect pin and the configuration channel pin may be collectively referred to as configuration pins. The configuration pins bypass the multiplexer 830 by connecting directly to the DisplayPort source device 820 or the power delivery controller 840, allowing control logic of the combination connector 200 to detect port attach and detach, cable orientation, role detection, and port control independently of the multiplexer 830 and current operating mode.

In the example of FIG. 8, the first communication interface 110 and the second communication interface 120 are connected to the multiplexer 830 in series. However, as shown in FIG. 9, in certain examples the first communication interface 110 and the second communication interface 120 can be connected to the multiplexer 830 in parallel to selectively enable only one interface at a time.

Figure 9:
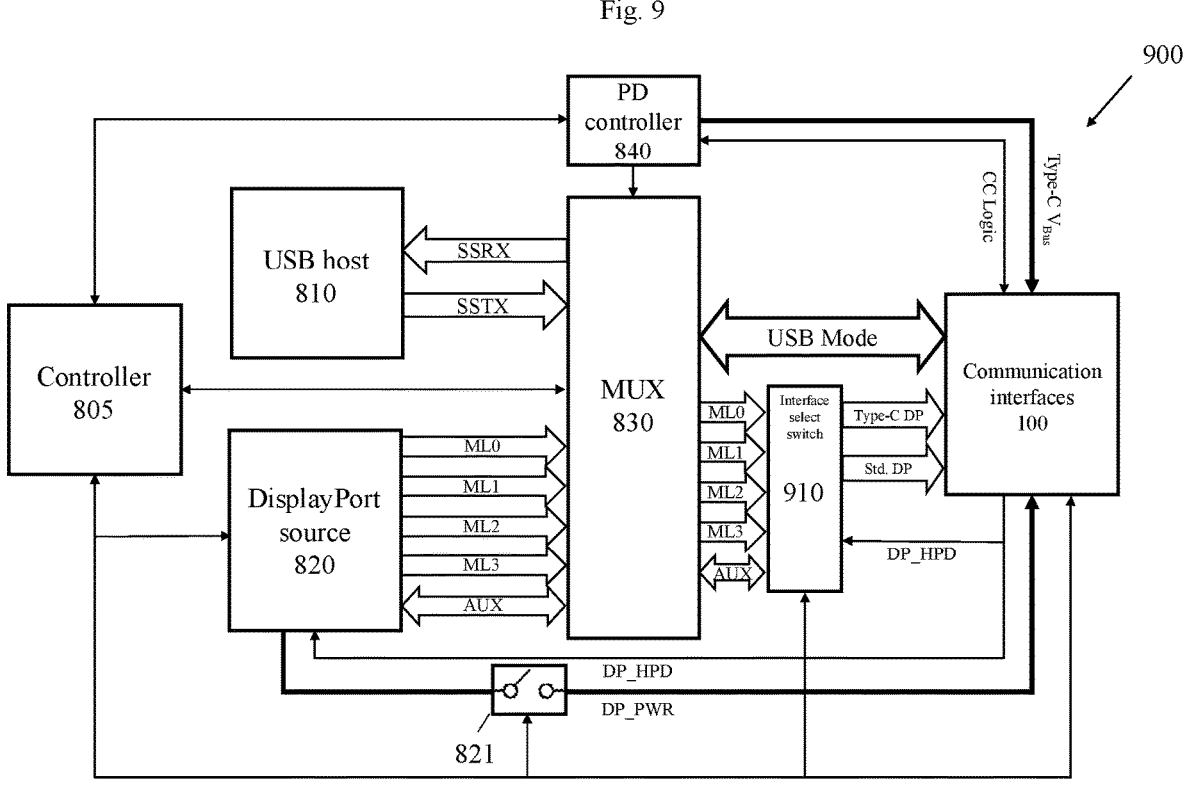
FIG. 9 is a schematic representation of another example of a control circuit for operating the combination connector of any of FIGS. 1-7.

FIG. 9 is a schematic representation of another example in accordance with aspects of the present application and illustrating a control circuit 900 for operating the combination connector 200. While similar to the control circuit 800 of FIG. 8, the control circuit 900 further includes an interface selection switch 910 connected between the multiplexer 830 and the interface PCB 100 to selectively enable the first communication interface 110 or the second communication interface 120. The interface selection switch 910 can be a transistor (e.g., a MOSFET), a relay, or another type of electronically operated switch.

In the USB operating mode, the multiplexer 830 bypasses the interface selection switch 910 to connect serial data lines of the USB host device 810 directly to the second communication interface 120. In the DisplayPort operating mode, the plurality of data lanes from the DisplayPort source device 820 are routed through the interface selection switch 910 to either the first communication interface 110 or the second communication interface 120.

The interface selection switch 910 allows the electronic device to output DisplayPort or other video transmission protocols via a full-size DisplayPort cable connector or by a miniaturized Type-C cable connector. When the DisplayPort source device 820 detects activity on the hot plug detect pin, the source device 820 can signal the controller 805 to set the interface selection switch to the first communication interface 110 corresponding to a full-size DisplayPort cable connector. When the power delivery controller 840 detects activity on the configuration channel pin, the PD controller 840 can signal the controller 805 to set the interface selection switch to the second communication interface 120 corresponding to a Type-C cable connector. Although the second communication interface 120 is also referred to a serial interface, it is not limited to only USB operation. Accordingly, the Display Port source device 820 can selectively output DisplayPort or other video signals to a supported peripheral device by either communication interface of the combination connector 200.

By selectively connecting the first communication interface 110 or the second communication interface 120 to the multiplexer 830 via the interface selection switch 910 (i.e., rather than connecting the first communication interface 110 and the second communication interface 120 to the multiplexer 830 in parallel as in FIG. 8), signal reflections along the various data channels can be blocked, reducing a bit error rate of the combination connector 200.

While operating in the DisplayPort mode, the combination connector 200 can support various video standards implemented by the DisplayPort source device 820. The DisplayPort source device 820 can support communication over various DisplayPort standards including DP 1.0 through DP 2.1. The DisplayPort source device 820 can also be a dual-mode device capable of outputting High-Definition Multimedia interface (HDMI) signals, Digital Visual Interface (DVI) signals, or other supported video standards via the combination connector 200.

While operating in the USB mode, the combination connector 200 can support various USB standards implemented by the USB host device 810. The USB host device 810 can support communication over various USB standards including Full Speed USB, High Speed USB, Super Speed USB, Super Speed+, or any other USB operating mode.

Figure 10:
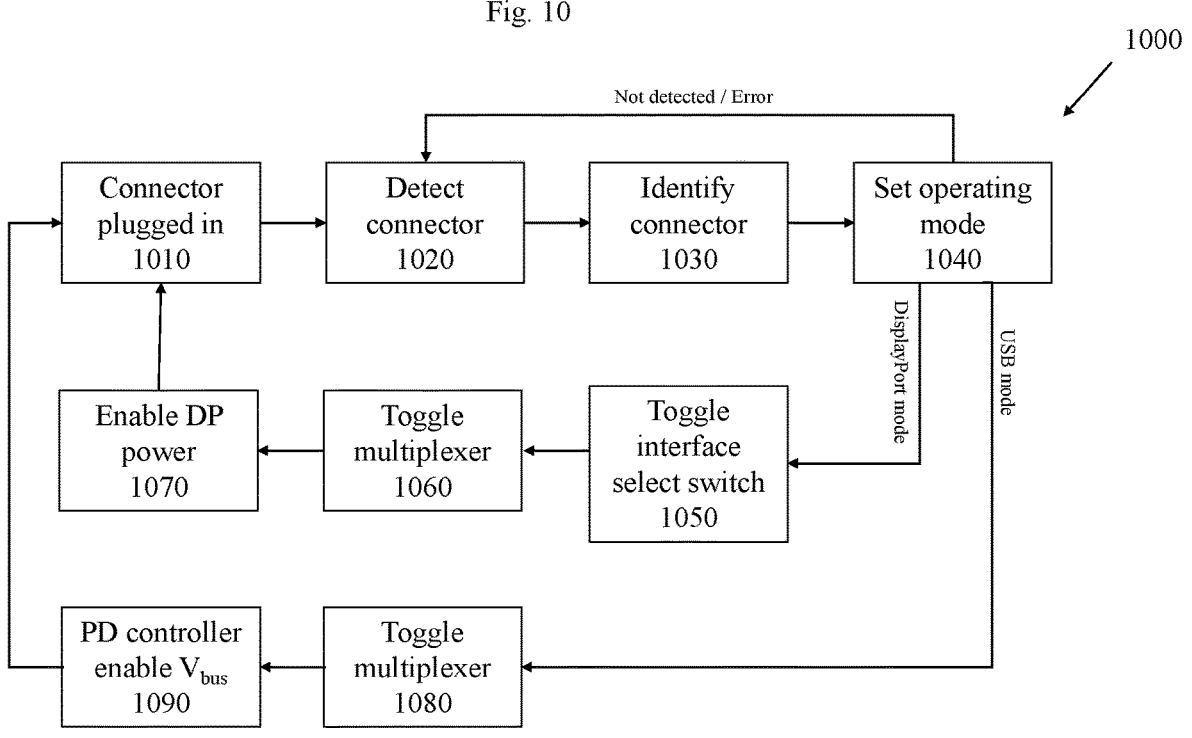
FIG. 10 is a flow diagram of an example of a method for operating the combination connector by the control circuits of FIGS. 8-9.

With reference now to FIG. 10, a flow diagram of an example method for controlling the combination connector 200 by the controller 805 will be described.

At block 1010, the user of the electronic device plugs in a cable connector or I/O baffle 330 by inserting it into the combination connector 200. At block 1020, the controller 805 detects activity at either of the pair of detection pins indicating a cable is now connected. The controller may add a brief delay to allow the user to finish fully inserting the cable connector. Then, at block 1030, the controller identifies the type of cable connector based on which of the first detection pin 230a and the second detection pin 230b is triggered (grounded) by the cable connector or I/O baffle. At block 1040, the controller 805 sets an operating mode of the combination connector 200 according to the state of the detection pins. If the controller 805 does not detect a cable connector or the cable connector is not recognized (e.g., the first detection pin 230a is logic low and the second detection pin 230b is logic high), the method will return to block 1020.

If the controller 805 identifies the cable connector as a DisplayPort connector, the combination connector is set to the DisplayPort operating mode and the method can continue to block 1050. At block 1050 (optional), the controller 805 can receive indications from the DisplayPort source device 820 or the power delivery controller 840 to toggle the interface selection switch 910 between the first communication interface 110 (DDI) and the second communication interface (serial interface) according to feedback from the configuration pins. At block 1060, the controller 805 causes the multiplexer 830 to connect the plurality of data lanes from the DisplayPort source device 820 to the interface selection switch 910 or directly to the combination connector 200. At block 1070, the controller 805 can toggle the switch 821 to enable power delivery from the DisplayPort source device 820 to the combination connector 200. The combination connector 200 remains in the DisplayPort operating mode until the controller 805 senses a change in the pair of detection pins, returning to block 1010.

If the controller 805 identifies the cable connector as a USB Type-C connector, the combination connector is set to the USB operating mode and the method can continue to block 1080. At block 1080, the controller 805 causes the multiplexer 830 to connect the plurality of serial lines from the USB host device 810 to the combination connector 200. At block 1090, the controller 805 signals the power delivery controller 840 to enable power delivery to the combination connector 200 via a USB power bus (Vbus). The combination connector 200 remains in the USB operating mode until the controller 805 senses a change in the pair of detection pins, returning to block 1010.

The principles of the examples described herein can be used for any other system or apparatus including mobile phones, tablets, base stations, network access points, customer-premises equipment (CPE), laptops, cameras, and wearable electronics.

Unless the context clearly requires otherwise, throughout the description and the claims, the words "comprise." "comprising." and the like are to be construed in an inclusive sense, as opposed to an exclusive or exhaustive sense; that is to say, in the sense of "including, but not limited to." The word "coupled," as generally used herein, refers to two or more elements that can be either directly connected, or connected by way of one or more intermediate elements. Likewise, the word "connected." as generally used herein, refers to two or more elements that can be either directly connected, or connected by way of one or more intermediate elements. Additionally, the words "herein." "above," "below," and words of similar import, when used in this application, shall refer to this application as a whole and not to any particular portions of this application. Where the context permits, words in the above Detailed Description using the singular or plural number can also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain examples include, while other examples do not include, certain features, elements and/or states. Thus, such conditional language is not generally intended to imply that features, elements and/or states are in any way required for one or more examples or that one or more examples necessarily include logic for deciding, with or without author input or prompting, whether these features, elements and/or states are included or are to be performed in any particular example.

What is claimed is:

1. An electronic device comprising:
a device housing; and
a combination connector resided in the device housing, the combination connector including:
   a substrate defining a first set of pins to electrically connect with a first type of connector and a second set of pins to electrically connect with a second type of connector;
   a connector housing defining an outward opening to accept the first type of connector or the second type of connector; and
   a pair of detection pins disposed on a surface of the substrate, the detection pins projecting outward from the connector housing into the opening;
   wherein a first detection pin of the pair of detection pins is triggered by the first type of connector; and
   wherein a second detection pin of the pair of detection pins is triggered by the second type of connector.
2. The electronic device of claim 1, wherein the substrate has a length defining a first edge and a second edge of the substrate, wherein the first edge of the substrate corresponds to a physical connection of the combination connector to a computing device and the second edge of the substrate is to receive a connector through the opening defined in the connector housing.

3. The electronic device of claim 2, further comprising a third set of pins disposed on the first edge of the substrate for connection to a motherboard of the computing device.
4. The electronic device of claim 2, wherein the first set of pins are proximate to the first edge and the second set of pins are proximate to the second edge.
5. The electronic device of claim 4, wherein the first set of pins are spaced apart along a substantial portion of a width of the substrate.
6. The electronic device of claim 5, wherein the second set of pins are centered along a central axis of the substrate.
7. The electronic device of claim 6, wherein the substrate includes a pair of notches on opposite sides of the second set of pins which define two equal-sized non-conductive portions of the substrate.
8. The electronic device of claim 1, further comprising an I/O baffle connected to the connector housing via the opening, wherein the I/O baffle includes a notch cutout such that connection of the I/O baffle to the combination connector causes the I/O baffle to contact only the first detection pin.
9. An electronic device comprising:
a combination connector comprising a first set of pins for electrically connecting to a first type of connector, and a second set of pins for electrically connecting to a second type of connector wherein the first type of connector is a Display Port (DP) connector and wherein the second type of connector is a Universal Serial Bus (USB) Type-C connector;
a multiplexer; and
a controller to:
   identify, via a first detection pin and a second detection pin of the combination connector, whether the first type of connector or the second type of connector is electrically connected to the combination connector;
   select an operating mode of the combination connector corresponding to the identified type of connector electrically connected to the combination connector; and
   connect, by the multiplexer, one or more data channels of the electronic device to the combination connector according to the selected operating mode.
10. The electronic device of claim 9, further comprising a power delivery controller to enable power delivery to the combination connector according to the selected operating mode.
11. The electronic device of claim 9, wherein the controller is to identify whether a first type of connector or a second type of connector is electrically connected to the combination connector and select an operating mode corresponding to the identified type of connector by:
   sensing, by the first detection pin and the second detection pin, a closed circuit formed by the first type of connector indicating a DisplayPort operating mode; or
   sensing, by the first detection pin, a closed circuit formed by the second type of connector, and sensing, by the second detection pin, an open circuit indicating a USB operating mode.
12. The electronic device of claim 11, wherein the controller is to identify whether a first type of connector or a second type of connector is electrically connected to the combination connector and select an operating mode corresponding to the identified type of connector by:
   sensing, by the first detection pin, an open circuit, and sensing, by the second detection pin, a closed circuit, indicating an error operating mode; or sensing, by the first detection pin and the second detection pin, an open circuit indicating a disabled operating mode.

13. The electronic device of claim 11, further comprising a removable input-output (I/O) baffle which forms a closed circuit with the first detection pin, wherein the I/O baffle defines an opening adjacent to the second set of pins to receive the second type of connector, and wherein the opening has a profile corresponding to the second type of connector to prevent the first type of connector from being connected.

14. The electronic device of claim 11, wherein the controller is to connect one or more data channels to the combination connector according to the selected operating mode by:

selecting, by the multiplexer in the DisplayPort operating mode, a plurality of data lanes to electrically connect to the first set of pins; or selecting, by the multiplexer in the USB operating mode, a plurality of serial data channels to electrically connect to the second set of pins.

15. The electronic device of claim 14, wherein the first set of pins and the second set of pins of the combination connector are connected to the multiplexer in series; or the first set of pins and the second set of pins of the combination connector are connected to the multiplexer in parallel via an interface selection switch.

16. An electronic device comprising:

a DisplayPort source device and a Universal Serial Bus (USB) host device;

a combination connector comprising a digital display interface (DDI), a serial interface, a first detection pin, and a second detection pin;

a multiplexer to selectively connect the DDI to the DisplayPort source device or selectively connect the serial interface to the USB host device corresponding to an operating mode of the combination connector;

a power delivery controller to enable power delivery to the combination connector corresponding to the operating mode; and a controller to:

identify, by the first and second detection pins, a connection state of the combination connector; and select a video operating mode or a serial operating mode of the combination connector according to the connection state;

wherein the DisplayPort source device is a dual-mode device supporting a first video transmission protocol and a second video transmission protocol in the video operating mode; and wherein the USB host device supports a Super Speed USB protocol in the serial operating mode.

17. The electronic device of claim 16, wherein the first video transmission protocol is a DisplayPort protocol and the second video transmission protocol is a High-Definition Multimedia Interface (HDMI) protocol.

18. The electronic device of claim 17, wherein the controller is to identify a connection state of the combination connector and select a video operating mode or a serial operating mode of the combination connector according to the connection state by:

identifying, via the first and second detection pins, whether a connector is connected to the combination connector; and sensing, by the second detection pin, a closed circuit formed by a DisplayPort connector indicating the video operating mode; or sensing, by the second detection pin, an open circuit formed by a USB Type-C connector indicating the serial operating mode.

19. The electronic device of claim 18, wherein the controller is to connect one or more data channels of the DisplayPort source device or the USB host device to the combination connector by:

selecting, by the multiplexer in the video operating mode, a plurality of data lanes of the DisplayPort source device to electrically connect to the DDI; or selecting, by the multiplexer in the serial operating mode, a plurality of serial data channels of the USB host device to electrically connect to the serial interface;

wherein the DDI and the serial interface are selectively connected to the multiplexer by an interface switch to block signal reflections.

20. The electronic device of claim 9, wherein the first set of pins is configured to be directly connected to the DP connector; and wherein the second set of pins is configured to be directly connected to the USB Type-C connector.

* * * * *